Patented June 24, 1930

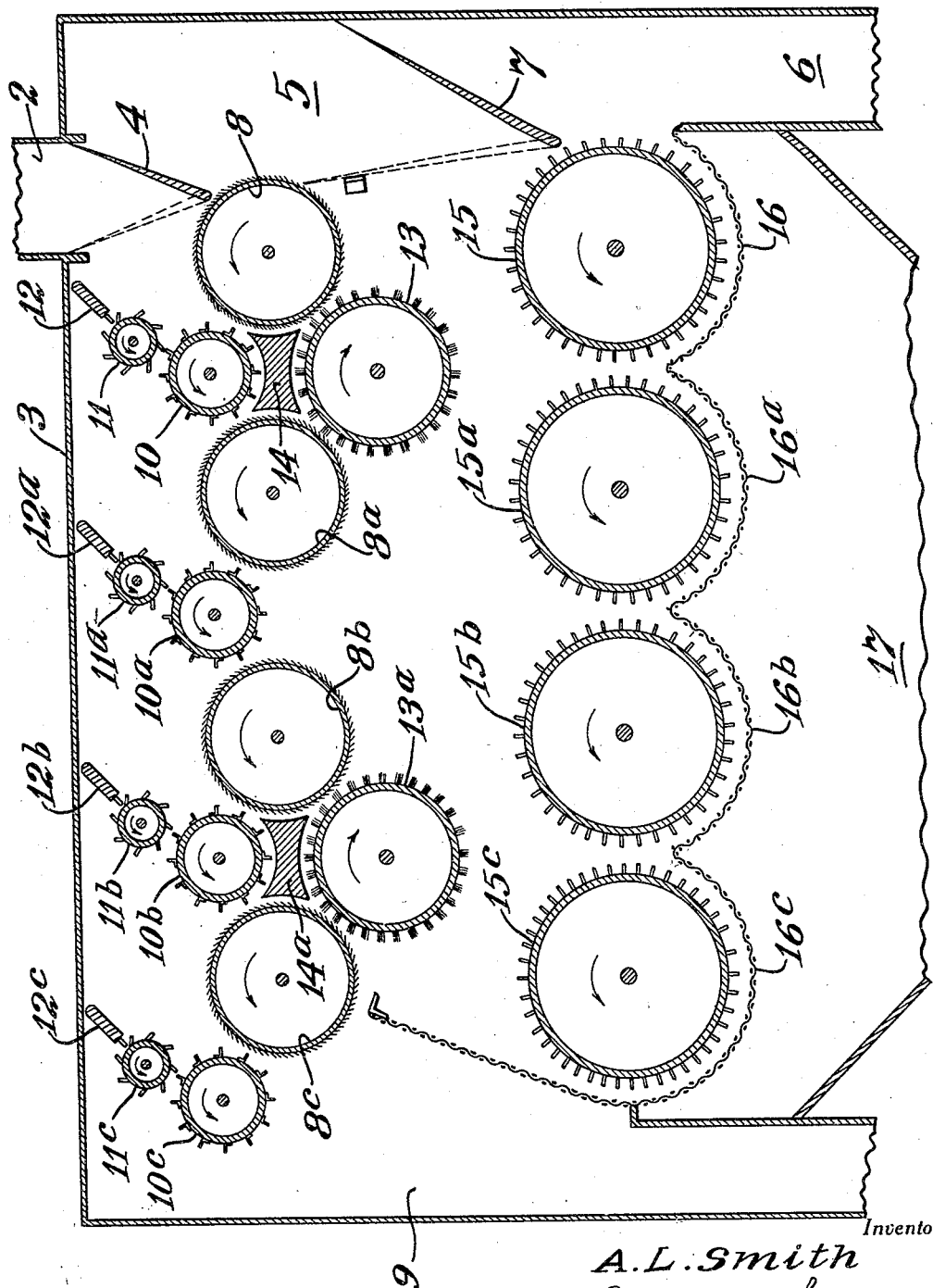

1,766,312

UNITED STATES PATENT OFFICE

ALGERNON L. SMITH, OF BIRMINGHAM, ALABAMA

HULL EXTRACTOR

Application filed April 23, 1928. Serial No. 272,272.

My invention relates to an apparatus suitable for the removal of hulls and foreign matter from fibrous material such as seed cotton and is more particularly concerned with improving and perfecting the hull extractor which forms the subject matter of Letters Patent No. 1,656,398, issued to me on January 17th, 1928.

Prior to the invention described in my aforesaid Letters Patent, machines for the removal of hulls and the like from seed cotton generally comprised a saw cylinder or like element with which was associated on its up-going side, i. e., on the side toward the approaching seed cotton and hulls to be treated, a stripper roller having a direction of rotation that would cause it to knock all of the hulls and foreign matter engaged by it back into the seed cotton and hulls under treatment.

In my patented hull extractor the stripper roller was arranged to co-act with the down-going side of the saw cylinder or equivalent element, that is to say, it co-acted with the side of the saw away from the seed cotton and hulls approaching the saw for treatment. It was considered necessary that a plurality of saw cylinders be arranged to act successively on the hulls as they were deflected from the seed cotton by the successive stripper rollers. In actual practice, with a machine embodying the principles of construction and operation described in my Letters Patent aforesaid, it was found that the seed cotton and hulls tended to travel too rapidly through the machine, thereby necessitating either that a greater number of saw cylinders, or their equivalent assembles, be used, or that some means be provided that would retard their rate of travel of the hulls with attached seed cotton through the machine.

My present invention is concerned with the solving of the problem above referred to and it contemplates maintaining the stripper rollers on the down-going side of their respective saws or in such relation thereto as to be able to pass hulls to the hull discharge or to the next succeeding saw, each saw and its respective stripper roller being associated with some suitable agency adapted to retard the travel of the hulls with attached seed cotton through the apparatus, allowing only the desired percentage thereof to pass directly to the next succeeding saw cylinder, and yet holding back sufficient hulls and foreign matter so that the rate of travel of the product to the hull discharge is sufficiently reduced to provide for effective separation of the hulls.

My invention further contemplates the arrangement below the saw assembles of a plurality of cleaning drums arranged to receive the seed cotton as it is discharged from the saw cylinders and pass the same over suitable screens for the removal of shale and dirt before the cleaned seed cotton is passed to the discharge opening provided therefor.

It is within the contemplation of my invention that desirable results can be obtained, particularly in the field, by the treatment of the seed cotton and bolls with a single saw assembly.

My invention further comprises the novel details of construction and arrangements of parts, which are hereinafter more particularly described and claimed, reference being had to the accompanying drawings for illustrative purposes.

In the drawings a longitudinal vertical cross section is shown through an apparatus embodying my invention and providing a plurality of saw assembles adapted to successively act upon the seed cotton and hulls before the separated hulls are discharged.

In the drawings, 2 indicates the inlet through which the seed cotton and hulls, or like fibrous material to be treated, enters the hull extractor casing 3. A suitable deflecting valve 4 is pivotally mounted within the casing so as to deliver seed cotton, not requiring treatment in the machine, to the passage 5 through which it will fall to the outlet 6 for the cleaned seed cotton, the lower deflecting valve 7 being shifted to its dotted position under such operating conditions. When it is desired however to treat the cotton in the apparatus, the deflectors 4 and 7 are shifted to their full line position and then the entering cotton and hulls will be engaged by the toothed cylinder 8, and this cylinder is rotated counter-clockwise as shown, i. e., so as to carry the cotton and hulls inwardly of the apparatus and towards the hull discharge chute 9. The hulls are engaged by a stripper roller 10 also rotating counter-clockwise and so disposed that it will knock the hulls upwardly and away from the seed cotton being engaged by the cylinder 8. Experience has shown that this stripper roller 10 gives best satisfaction when co-acting with the down-going side of the cylinder 8 and it must be located in such position that it will not act to knock all of the hulls back into the material engaging the toothed cylinder 8, as this would cause the hulls to be unduly cut up. By setting the stripper roller substantially as shown, a large percentage of the hulls engaged by it will be passed directly to the succeeding toothed cylinder $8^a$, or, where a single toothed cylinder assembly is used, the hulls will be passed directly to the hull outlet.

In order to prevent the hulls with attached seed cotton passing too rapidly to the hull outlet and to insure the proper removal of the seed cotton from the hulls, I arrange suitable retarding agencies to slow up the travel of the hulls towards the outlet 9 and to regulate their escape from each toothed cylinder assembly. The preferred means is a spiked roller 11 rotating also counter-clockwise and associated above with a spiked baffle 12 extending approximately to the top wall of the casing, and adjusted to prevent the escape of the hulls except between the elements 10 and 11.

In the apparatus shown, the hulls with any attached seed cotton discharged from the first toothed cylinder assembly will be engaged by the second toothed cylinder assembly comprising a cylinder $8^a$ with which will co-act the elements $10^a$, $11^a$ and $12^a$ with the same arrangement and results as described for the corresponding elements 8, 10, 11 and 12. The hulls and any remaining seed cotton associated therewith will be delivered to the third toothed cylinder assembly comprising the cylinder $8^b$, stripper roller $10^b$, spiked roller $11^b$ and baffle $12^b$, and this assembly will in turn deliver the remaining hulls to the final toothed cylinder assembly comprising the cylinder $8^c$, stripper roller $10^c$, spiked roller $11^c$ and baffle $12^c$, the hulls from this toothed cylinder assembly being delivered to the hull outlet 9.

Any suitable provision may be made for removing the seed cotton adhering to the toothed cylinders, the apparatus shown comprising doffing means such as the brush 13 co-acting with the cylinders 8 and $8^a$, and the brush $13^a$ co-acting with the cylinders $8^b$ and $8^c$. Suitable separators and cross connecting elements 14 and $14^a$ are provided between the pairs of cylinders above each doffing brush.

The seed cotton discharged from the toothed cylinders falls upon the spiked cleaner drums 15, $15^a$, $15^b$ and $15^c$, which all rotate counter-clockwise and thus collect and carry the seed cotton to the left side of the machine and then pass it back over the screen concaves $16^c$, $16^b$, $16^a$ and 16 and deliver it into the seed cotton outlet 6. The dirt and trash removed through the screens falls into a hopper 17 and passes through a suitable discharge.

In operation, the seed cotton and hulls as they enter are quickly engaged by the toothed cylinder 8 and carried over to the adjacent stripper roller 10 which tends to disengage the hulls and pass them very rapidly to the hull discharge or to the next succeeding toothed cylinder $8^a$. The retarding agency in the form of the spiked roller 11 and baffle 12, acts to prevent the hulls passing as it were too rapidly to the next toothed cylinder or to the hull discharge, but it is adapted to permit the major part of the hulls to pass thus directly, holding back just enough to insure that the desired percentage of seed cotton will be removed from the hulls before they pass to the next toothed cylinder assembly or to the discharge. Hence, in field work, the seed cotton and hulls can be subjected to a single treatment, the doffed seed cotton passing to the cotton outlet and the extracted hulls to the hull outlet, but for the more effective treatment a plurality of toothed cylinder assembles is desirable.

It is also desirable that the cylinders should be arranged substantially on a level so that gravity does not tend to accelerate the travel of the hulls to the discharge. Such horizontal arrangement of the saw cylinders, however, is to be regarded as preferable only because the retarding agencies provided can be designed and adapted to so control the rate of flow, whether horizontally or downwardly, of the hulls through the treatment space that the saws will have the necessary opportunity for removing the seed cotton from the hulls without at the same time unduly cutting up the hulls and increasing the amount of hull trash and shale in the seed cotton to an objectionable extent.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. In an apparatus for the removal of hulls and trash from seed cotton or the like, a casing having a feed inlet, a seed cotton outlet, a hull outlet and a plurality of toothed cylinders disposed to engage the hulls and seed cotton successively and rotatable in a direction to move the hulls progressively towards the hull outlet, a group of agencies associated with each saw cylinder, each group comprising a stripper roller so disposed and rotated as to be adapted to deliver the hulls knocked off of a cylinder to the next succeeding cylinder, and a means to regulate the rate of delivery of the hulls by a picker roller of one group to the cylinder of the succeeding group.

2. In an apparatus for removing hulls from seed cotton and the like, a casing having a feed opening, a toothed cylinder adapted to engage the entering seed cotton and hulls, a rotating stripper element co-acting with the down-going side of the said cylinder remote from the feed opening and adapted to deliver hulls engaged thereby to a second saw cylinder, a second toothed cylinder having the same direction of rotation as the first mentioned cylinder, agencies co-acting with the first mentioned stripper element to control the rate of feed of the hulls thereby to the second toothed cylinder, a stripper means associated with the second toothed cylinder, and agencies to doff the cotton from said cylinders.

3. In an apparatus for hulling seed cotton and the like according to claim 2, in which the toothed cylinders are arranged with their axes in a substantially horizontal plane.

4. An apparatus for removing hulls from seed cotton and the like, comprising a casing having a feed opening, a toothed cylinder adapted to draw seed cotton and hulls inwardly from the opening, a stripper roller co-acting with the toothed cylinder on its down-going side remote from the feed opening and having the same direction of rotation as the toothed cylinder, a spiked roller arranged above the stripper roller and having a like direction of rotation, and a second group of agencies corresponding to those above described, the toothed cylinder of the second group being adapted to receive hulls and any adhering seed cotton in regulated and controlled volume from the first mentioned group of agencies, and separate outlets for the hulls and seed cotton.

In testimony whereof I affix my signature.

ALGERNON L. SMITH.